(12) United States Patent
Kim et al.

(10) Patent No.: US 10,502,285 B2
(45) Date of Patent: Dec. 10, 2019

(54) PLANETARY GEAR TRAIN OF AUTOMATIC TRANSMISSION FOR VEHICLE

(71) Applicants: HYUNDAI MOTOR COMPANY, Seoul (KR); KIA MOTORS CORPORATION, Seoul (KR)

(72) Inventors: Jin Ho Kim, Suwon-si (KR); Dong Hwan Hwang, Seoul (KR); Jong Sool Park, Hwaseong-si (KR); Jong Soo Kim, Seoul (KR); Kyeong Hun Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 217 days.

(21) Appl. No.: 15/710,025

(22) Filed: Sep. 20, 2017

(65) Prior Publication Data

US 2018/0328456 A1 Nov. 15, 2018

(30) Foreign Application Priority Data

May 10, 2017 (KR) .......................... 10-2017-0058331

(51) Int. Cl.
*F16H 3/60* (2006.01)
*F16H 3/62* (2006.01)
*F16H 63/30* (2006.01)
*F16H 57/00* (2012.01)
*F16H 57/02* (2012.01)

(52) U.S. Cl.
CPC ............ *F16H 3/62* (2013.01); *F16H 57/0018* (2013.01); *F16H 63/3026* (2013.01); *F16H 2057/02047* (2013.01); *F16H 2057/02095* (2013.01); *F16H 2200/0069* (2013.01); *F16H 2200/2015* (2013.01); *F16H 2200/2046* (2013.01)

(58) Field of Classification Search
CPC ............................... F16H 3/62; F16H 57/0018
See application file for complete search history.

(56) References Cited

U.S. PATENT DOCUMENTS 4,742,733 A * 5/1988 Schreiner .................. F16H 3/66
477/120

\* cited by examiner

*Primary Examiner* — Derek D Knight
(74) *Attorney, Agent, or Firm* — Brinks Gilson & Lione

(57) ABSTRACT

A planetary gear train of an automatic transmission may include: an input shaft; an output shaft; first to fifth planetary gear sets each including first to third rotation elements, fourth to sixth rotation elements, seventh to ninth rotation elements, tenth to twelfth rotation elements, thirteenth to fifteenth rotational elements; a first shaft connected with the second rotation element and the input shaft; a second shaft connected with the fourteenth rotation element and the output shaft; a third shaft connected with the sixth, seventh and thirteenth rotation elements; a fourth shaft connected with the tenth and fifteenth rotation elements; a fifth shaft connected with the third and fourth rotation elements; a sixth shaft connected with the fifth, eighth, and eleventh rotation elements; a seventh shaft connected with the ninth rotation element; an eighth shaft connected with the first rotation element; and a ninth shaft connected with the twelfth rotation element.

17 Claims, 3 Drawing Sheets

FIG. 2

| speed stages | engaging elements | | | | | | gear ratio | step ratio | note |
|---|---|---|---|---|---|---|---|---|---|
| | C1 | C2 | C3 | B1 | B2 | B3 | | | |
| D1 |  | ● |  | ● | ● |  | 4.021 | 1.523 | gear ratio span: 8.722 ratio of R/D1: 0.86 |
| D2 |  | ● | ● | ● |  |  | 2.620 | 1.390 | |
| D3 | ● | ● |  | ● |  |  | 1.899 | 1.445 | |
| D4 | ● |  | ● | ● |  |  | 1.314 | 1.314 | |
| D5 | ● | ● | ● |  |  |  | 1.000 | 1.170 | |
| D6 | ● |  | ● |  |  | ● | 0.855 | 1.211 | |
| D7 | ● |  |  |  | ● | ● | 0.706 | 1.207 | |
| D8 | ● | ● |  |  |  | ● | 0.585 | 1.170 | |
| D9 |  | ● |  |  | ● | ● | 0.500 | 1.085 | |
| D10 |  | ● | ● |  |  | ● | 0.461 | | |
| REV1 |  |  | ● | ● | ● |  | -3.466 | - | |
| REV2 |  |  | ● | ● |  | ● | -3.466 | - | |
| REV3 |  |  |  | ● | ● | ● | -3.466 | - | |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2017-0058331, filed on May 10, 2017, which is incorporated herein by reference in its entirety.

FIELD

The present disclosure relates to a planetary gear train of an automatic transmission for a vehicle that improves power delivery performance and fuel economy.

BACKGROUND

The statements in this section merely provide background information related to the present disclosure and may not constitute prior art.

Generally, an automatic transmission achieving more speed stages has been developed to enhance fuel efficiency and drivability.

Such an automatic transmission achieving more speed stages is desired to increase power performance and driving efficiency for downsizing of an engine. Particularly, a highly efficient multiple-speed transmission having excellent linearity of step ratios closely relates to drivability of a vehicle (e.g., acceleration before and after gear shifts as well as rhythmical engine speed).

However, in the automatic transmission, as the number of speed stages increase, the number of internal components increase, and as a result, mountability, cost, weight, transmission efficiency, and the like are undermined.

Accordingly, development of a planetary gear train which may achieve better efficiency with reduced components may be important in order to increase a fuel efficiency enhancement through the multiple-speeds.

In this background, an eight-speed automatic transmission has been introduced recently and a planetary gear train for an automatic transmission enabling more shift-stages has been developed.

However, we have discovered that since a conventional eight-speed automatic transmission has gear ratio span of 6.5-7.5 (gear ratio span is a factor for securing linearity of step ratios), power performance and fuel economy is not great.

In addition, if an eight-speed automatic transmission has gear ratio span larger than 9.0, it is hard to secure linearity of step ratios. Therefore, driving efficiency of an engine and drivability of a vehicle may be deteriorated.

The above information disclosed in this Background section is only for enhancement of understanding of the background of the present disclosure and therefore it may contain information that does not form the prior art that is already known in this country to a person of ordinary skill in the art.

SUMMARY

The present disclosure has been made in an effort to provide a planetary gear train of an automatic transmission for a vehicle having advantages of improving power delivery performance and fuel economy by achieving ten forward speed stages and one reverse speed stage and reducing drag loss of clutches and brakes using five planetary gear sets and six engaging elements.

An exemplary form of the present disclosure provides a planetary gear train of an automatic transmission for a vehicle having further advantages of improving torque delivery efficiency and durability by using a planetary gear set of an output side in torque parallel type and reducing torque share of each planetary gear set and each engaging element.

Yet another form of the present disclosure provides a high-efficiency planetary gear train of an automatic transmission for a vehicle having further advantages of increasing flexibility of output gear ratios and improving linearity of step ratios by using five planetary gear sets for achieving ten forward speed stages and one reverse speed stage.

A planetary gear train of an automatic transmission for a vehicle according to an exemplary form of the present disclosure may include: an input shaft receiving torque from an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a fifth planetary gear set including thirteenth, fourteenth, and fifteenth rotational elements; a first shaft connected with the second rotation element and the input shaft; a second shaft connected with the fourteenth rotation element and the output shaft; a third shaft connected with the sixth rotation element, the seventh rotation element, and the thirteenth rotation element; a fourth shaft connected with the tenth rotation element and the fifteenth rotation element; a fifth shaft connected with the third rotation element and the fourth rotation element; a sixth shaft connected with the fifth rotation element, the eighth rotation element, and the eleventh rotation element; a seventh shaft connected with the ninth rotation element; an eighth shaft connected with the first rotation element; and a ninth shaft connected with the twelfth rotation element.

The planetary gear train may further include: six engaging elements selectively connecting, among the nine shafts, any one shaft with another shaft or a corresponding shaft selected from the nine shafts with a transmission housing, wherein any one of forward speed stages or a reverse speed stage is achieved by operating three engaging elements among the six engaging elements.

The six engaging elements may include: three clutches, any one thereof connecting any two shafts among the nine shafts; and three brakes, any one thereof selectively connecting the corresponding shaft selected from the nine shafts to the transmission housing, wherein the corresponding shaft is not connected with the input shaft or the output shaft.

In one aspect, the six engaging elements may include: a first clutch disposed between the second shaft and the fifth shaft; a second clutch disposed between the first shaft and the seventh shaft; a third clutch disposed between the sixth shaft and the eighth shaft; a first brake disposed between the fourth shaft and the transmission housing; a second brake disposed between the eighth shaft and the transmission housing; and a third brake disposed between the ninth shaft and the transmission housing.

In another aspect, the six engaging elements may include: a first clutch disposed between the second shaft and the fifth shaft; a second clutch disposed between the first shaft and the seventh shaft; a third clutch disposed between the seventh shaft and the eighth shaft; a first brake disposed between the fourth shaft and the transmission housing; a second brake disposed between the eighth shaft and the transmission housing; and a third brake disposed between the ninth shaft and the transmission housing.

The first, second, and third rotational elements may be a first sun gear, a first planet carrier, and a first ring gear respectively, the fourth, fifth, and sixth rotational elements may be a second sun gear, a second planet carrier, and a second ring gear respectively, the seventh, eighth, and ninth rotational elements may be a third sun gear, a third planet carrier, and a third ring gear respectively, the tenth, eleventh, and twelfth rotational elements may be a fourth sun gear, a fourth planet carrier, and a fourth ring gear respectively, and the thirteenth, fourteenth, and fifteenth rotational elements may be a fifth sun gear, a fifth planet carrier, and a fifth ring gear respectively.

The first, second, third, fourth, and fifth planetary gear sets may be disposed in a sequence of the first, second, third, fourth, and fifth planetary gear sets from an engine side.

A planetary gear train of an automatic transmission for a vehicle according to another exemplary form of the present disclosure may include: an input shaft receiving torque from an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a fifth planetary gear set including thirteenth, fourteenth, and fifteenth rotational elements; a first shaft connected with the second rotation element and the input shaft; a second shaft connected with the fourteenth rotation element and the output shaft; a third shaft connected with the sixth rotation element, the seventh rotation element, and the thirteenth rotation element; a fourth shaft connected with the tenth rotation element and the fifteenth rotation element; a fifth shaft connected with the third rotation element and the fourth rotation element; a sixth shaft connected with the fifth rotation element, the eighth rotation element, and the eleventh rotation element; a seventh shaft connected with the ninth rotation element; and a plurality of shafts configured to selectively and respectively connect a transmission housing to corresponding rotation elements selected from the rotation elements of the first and fourth planetary gear sets, wherein the corresponding rotation elements are not connected to any of the first to seventh shafts.

The plurality of shafts may include: an eighth shaft connected with the first rotation element; and a ninth shaft connected with the twelfth rotation element.

The planetary gear train may further include: three clutches, any one thereof connecting any two shafts among the nine shafts; and three brakes, any one thereof selectively connecting the transmission housing to a corresponding shaft selected from the nine shafts, wherein the selected corresponding shaft is not connected with the input shaft or the output shaft.

In one aspect, the three clutches may include: a first clutch disposed between the second shaft and the fifth shaft; a second clutch disposed between the first shaft and the seventh shaft; and a third clutch disposed between the sixth shaft and the eighth shaft.

The three brakes may include: a first brake disposed between the fourth shaft and the transmission housing; a second brake disposed between the eighth shaft and the transmission housing; and a third brake disposed between the ninth shaft and the transmission housing.

In another aspect, the three clutches may include: a first clutch disposed between the second shaft and the fifth shaft; a second clutch disposed between the first shaft and the seventh shaft; and a third clutch disposed between the seventh shaft and the eighth shaft.

The three brakes may include: a first brake disposed between the fourth shaft and the transmission housing; a second brake disposed between the eighth shaft and the transmission housing; and a third brake disposed between the ninth shaft and the transmission housing.

The first, second, and third rotational elements may be a first sun gear, a first planet carrier, and a first ring gear respectively, the fourth, fifth, and sixth rotational elements may be a second sun gear, a second planet carrier, and a second ring gear respectively, the seventh, eighth, and ninth rotational elements may be a third sun gear, a third planet carrier, and a third ring gear respectively, the tenth, eleventh, and twelfth rotational elements may be a fourth sun gear, a fourth planet carrier, and a fourth ring gear respectively, and the thirteenth, fourteenth, and fifteenth rotational elements may be a fifth sun gear, a fifth planet carrier, and a fifth ring gear respectively.

The first, second, third, fourth, and fifth planetary gear sets may be disposed in a sequence of the first, second, third, fourth, and fifth planetary gear sets from an engine side.

A planetary gear train of an automatic transmission for a vehicle according to another exemplary form of the present disclosure may include: an input shaft receiving torque of an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a fifth planetary gear set including thirteenth, fourteenth, and fifteenth rotational elements; a first shaft connected with the second rotation element and the input shaft; a second shaft connected with the fourteenth rotation element and the output shaft; a third shaft connected with the sixth rotation element, the seventh rotation element, and the thirteenth rotation element; a fourth shaft connected with the tenth rotation element and the fifteenth rotation element; a fifth shaft connected with the third rotation element and the fourth rotation element; a sixth shaft connected with the fifth rotation element, the eighth rotation element, and the eleventh rotation element; a seventh shaft connected with the ninth rotation element; and eighth and ninth shafts configured to selectively and respectively connect, via brakes, a transmission housing to corresponding rotation elements selected from the rotation elements of the first and fourth planetary gear sets, wherein the corresponding rotation elements are not connected to any of the first to seventh shafts.

In one aspect, the second shaft and the fifth shaft, the first shaft and the seventh shaft, and the sixth shaft and the eighth shaft may be selectively connected with each other through clutches, the eighth shaft may be connected with the first rotation element, and the ninth shaft may be connected with the twelfth rotation element.

The clutches may include: a first clutch disposed between the second shaft and the fifth shaft; a second clutch disposed between the first shaft and the seventh shaft; and a third clutch disposed between the sixth shaft and the eighth shaft.

The planetary gear train may include brakes comprising: a first brake disposed between the fourth shaft and the transmission housing; a second brake disposed between the eighth shaft and the transmission housing; and a third brake disposed between the ninth shaft and the transmission housing.

In another aspect, the second shaft and the fifth shaft, the first shaft and the seventh shaft, and the seventh shaft and the eighth shaft may be selectively connected with each other through clutches, the eighth shaft may be connected with the first rotation element, and the ninth shaft may be connected with the twelfth rotation element.

The clutches may include: a first clutch disposed between the second shaft and the fifth shaft; a second clutch disposed between the first shaft and the seventh shaft; and a third clutch disposed between the seventh shaft and the eighth shaft.

The brakes may include: a first brake disposed between the fourth shaft and the transmission housing; a second brake disposed between the eighth shaft and the transmission housing; and a third brake disposed between the ninth shaft and the transmission housing.

The first, second, and third rotational elements may be a first sun gear, a first planet carrier, and a first ring gear respectively, the fourth, fifth, and sixth rotational elements may be a second sun gear, a second planet carrier, and a second ring gear respectively, the seventh, eighth, and ninth rotational elements may be a third sun gear, a third planet carrier, and a third ring gear respectively, the tenth, eleventh, and twelfth rotational elements may be a fourth sun gear, a fourth planet carrier, and a fourth ring gear respectively, and the thirteenth, fourteenth, and fifteenth rotational elements may be a fifth sun gear, a fifth planet carrier, and a fifth ring gear respectively.

According to exemplary forms of the present disclosure, ten forward speed stages and one reverse speed stage may be achieved by combining five planetary gear sets being simple planetary gear sets with six engaging elements.

In addition, since gear ratio span greater than 8.7 is secured, driving efficiency of the engine may be increased. In addition, since linearity of step ratios can be secured due to multiple speed stages, drivability such as acceleration before and after shift, rhythmical engine speed, and so on may be improved.

In addition, since ten forward speed stages and one reverse speed stages are achieved by using five planetary gear sets but the number of engaging elements is reduced, drag loss of clutches and brakes may be reduced and power delivery efficiency and fuel economy may be improved.

In addition, since a planetary gear set of an output side in torque parallel type is used and torque is evenly shared to each planetary gear set and each engaging element, torque delivery efficiency and durability may be improved.

In addition, since five planetary gear sets are used to achieve ten forward speed stages and one reverse speed stage, flexibility of output gear ratios may be increased and linearity of step ratios may be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is an operation chart of engaging elements at each speed stage in the planetary gear train according to the first exemplary form of the present disclosure.

Figure 1:
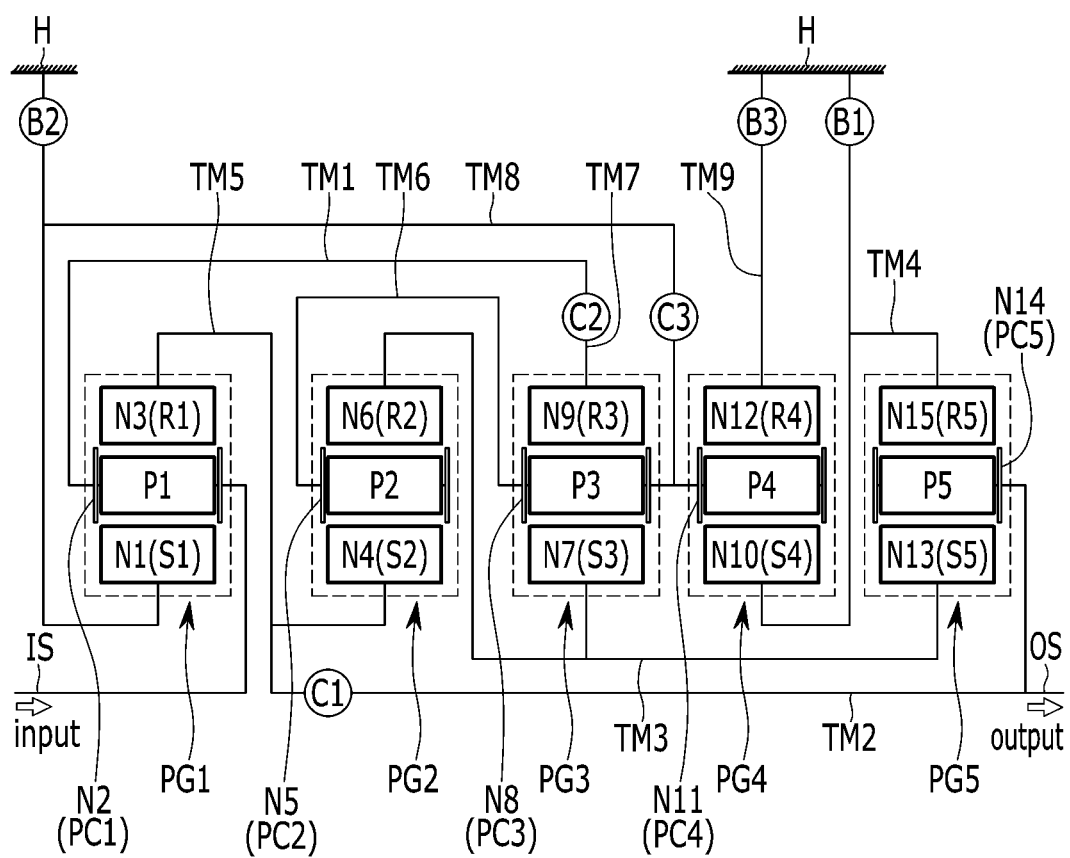
FIG. 1 is a schematic diagram of a planetary gear train according to a first exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

However, parts which are not related with the description are omitted for clearly describing the exemplary forms of the present disclosure.

In the following description, dividing names of components into first, second, and the like is to divide the names because the names of the components are the same as each other and an order thereof is not particularly limited.

Further, as used herein, description of elements being "fixedly" connected or interconnected includes elements that are directly connected, i.e. one element directly connected to another element for rotation therewith.

FIG. 1 is a schematic diagram of a planetary gear train according to a first exemplary form of the present disclosure.

Referring to FIG. 1, a planetary gear train includes: first, second, third, fourth, and fifth planetary gear sets PG1, PG2, PG3, PG4, and PG5 disposed on a same axis; an input shaft IS; an output shaft OS; nine shafts TM1 to TM9 connected to at least one rotation element of the first, second, third, fourth, and fifth planetary gear sets PG1, PG2, PG3, PG4, and PG5; engaging elements including three clutches C1 to C3 and three brakes B1 to B3; and a transmission housing H.

Torque input from an engine to the input shaft IS is changed by cooperation of the first, second, third, fourth, and fifth planetary gear sets PG1, PG2, PG3, PG4, and PG5, and the changed torque is output through the output shaft OS.

According to the first exemplary form of the present disclosure, the planetary gear sets are disposed in a sequence of the first, second, third, fourth, and fifth planetary gear sets PG1, PG2, PG3, PG4, and PG5 from an engine side.

The input shaft IS is an input member and torque from a crankshaft of the engine is torque-converted through a torque converter to be input into the input shaft IS.

The output shaft OS is an output member, as disposed on the same axis with the input shaft IS, and transmits driving torque to a driving wheel through a differential apparatus.

The first planetary gear set PG1 is a single pinion planetary gear set and includes a first sun gear S1 as a first rotation element N1, a first planet carrier PC1 as a second rotation element N2 rotatably supporting a plurality of first pinion gears P1 evenly disposed on and externally engaged with an exterior circumference of the first sun gear S1, and a first ring gear R1 as a third rotation element N3 internally engaged with the plurality of first pinion gears P1 and operably connected with the first sun gear S1.

The second planetary gear set PG2 is a single pinion planetary gear set and includes a second sun gear S2 as a fourth rotation element N4, a second planet carrier PC2 as a fifth rotation element N5 rotatably supporting a plurality of second pinion gears P2 evenly disposed on and externally engaged with an exterior circumference of the second sun gear S2, and a second ring gear R2 as a sixth rotation element N6 internally engaged with the plurality of second pinion gears P2 and operably connected with the second sun gear S2.

The third planetary gear set PG3 is a single pinion planetary gear set and includes a third sun gear S3 as a seventh rotation element N7, a third planet carrier PC3 as an eighth rotation element N8 rotatably supporting a plurality of third pinion gears P3 evenly disposed on and externally engaged with an exterior circumference of the third sun gear S3, and a third ring gear R3 as a ninth rotation element N9 internally engaged with the plurality of third pinion gears P3 and operably connected with the third sun gear S3.

The fourth planetary gear set PG4 is a single pinion planetary gear set and includes a fourth sun gear S4 as a tenth rotation element N10, a fourth planet carrier PC4 as an eleventh rotation element N11 rotatably supporting a plurality of fourth pinion gears P4 evenly disposed on and externally engaged with an exterior circumference of the fourth sun gear S4, and a fourth ring gear R4 as a twelfth rotation element N12 internally engaged with the plurality of fourth pinion gears P4 and operably connected with the fourth sun gear S4.

The fifth planetary gear set PG5 is a single pinion planetary gear set and includes a fifth sun gear S5 as a thirteenth rotation element N13, a fifth planet carrier PC5 as a fourteenth rotation element N14 rotatably supporting a plurality of fifth pinion gears P5 evenly disposed on and externally engaged with an exterior circumference of the fifth sun gear S5, and a fifth ring gear R5 as a fifteenth rotation element N15 internally engaged with the plurality of fifth pinion gears P5 and operably connected with the fifth sun gear S5.

The third rotation element N3 is directly connected with the fourth rotation element N4, the fifth rotation element N5 is directly connected with the eighth rotation element N8 and the eleventh rotation element N11, the sixth rotation element N6 is directly connected with the seventh rotation element N7 and the thirteenth rotation element N13, and the tenth rotation element N10 is connected with the fifteenth rotation element N15 such that the first, second, third, fourth, and fifth planetary gear sets PG1, PG2, PG3, PG4, and PG5 operate together through nine shafts TM1 to TM9.

The nine shafts TM1 to TM9 will be described in further detail.

Some of the nine shafts TM1 to TM9 directly connect a plurality of rotation elements among the rotation elements of the planetary gear sets PG1, PG2, PG3, PG4, and PG5 with each other. The nine shafts maybe rotation members that are connected to any one rotation element of the rotation elements of the planetary gear sets PG1, PG2, PG3, PG4, and PG5, and rotate with the any one rotation element to transmit torque. The rotation members that selectively connect any one rotation element with the transmission housing H may be fixed members that directly and fixedly connect any one rotation element to the transmission housing H.

The first shaft TM1 is connected, and preferably fixedly connected, with the second rotation element N2 (first planet carrier PC1) and is directly connected with the input shaft IS to be continuously operated as an input element.

The second shaft TM2 is connected, and preferably fixedly connected, with the fourteenth rotation element N14 (fifth planet carrier PC5) and is directly connected with the output shaft OS to be continuously operated as an output element.

The third shaft TM3 is connected, and preferably fixedly connected, with the sixth rotation element N6 (second ring gear R2), the seventh rotation element N7 (third sun gear S3), and the thirteenth rotation element N13 (fifth sun gear S5).

The fourth shaft TM4 is connected, and preferably fixedly connected, with the tenth rotation element N10 (fourth sun gear S4) and the fifteenth rotation element N15 (fifth ring gear R5).

The fifth shaft TM5 is connected, and preferably fixedly connected, with the third rotation element N3 (first ring gear R1) and the fourth rotation element N4 (second sun gear S2).

The sixth shaft TM6 is connected, and preferably fixedly connected, with the fifth rotation element N5 (second planet carrier PC2), the eighth rotation element N8 (third planet carrier PC3), and the eleventh rotation element N11 (fourth planet carrier PC4).

The seventh shaft TM7 is connected, and preferably fixedly connected, with the ninth rotation element N9 (third ring gear R3).

The eighth shaft TM8 is connected, and preferably fixedly connected, with the first rotation element N1 (first sun gear S1).

The ninth shaft TM9 is connected, and preferably fixedly connected, with the twelfth rotation element N12 (fourth ring gear R4).

Here, the second shaft TM2 is selectively connected with the fifth shaft TM5, the first shaft TM1 is selectively connected with the seventh shaft TM7, and the sixth shaft TM6 is selectively connected with the eighth shaft TM8.

In addition, each of the fourth shaft TM4, the eighth shaft TM8, and ninth shaft TM9 is selectively connected with the transmission housing H to be operated as a selective fixed element.

Three clutches C1, C2, and C3 that are engaging elements are disposed at portions at which any two shafts among the nine shafts TM1 to TM9 including the input shaft IS and the output shaft OS are selectively connected with each other.

In addition, three brakes B1, B2, and B3 that are engaging elements are disposed at portions at which any one shaft among the nine shafts TM1 to TM9 is selectively connected with the transmission housing H.

Arrangement of the six engaging elements (three clutches C1 to C3 and three brakes B1 to B3) will be described in detail.

The first clutch C1 is disposed between the second shaft TM2 and the fifth shaft TM5 and selectively connects the second shaft TM2 with the fifth shaft TM5.

The second clutch C2 is disposed between the first shaft TM1 and the seventh shaft TM7 and selectively connects the first shaft TM1 with the seventh shaft TM7.

The third clutch C3 is disposed between the sixth shaft TM6 and the eighth shaft TM8 and selectively connects the sixth shaft TM6 with the eighth shaft TM8.

The first brake B1 is disposed between the fourth shaft TM4 and the transmission housing H and selectively connects and fixes the fourth shaft TM4 to the transmission housing H.

The second brake B2 is disposed between the eighth shaft TM8 and the transmission housing H and selectively connects and fixes the eighth shaft TM8 to the transmission housing H.

The third brake B3 is disposed between the ninth shaft TM9 and the transmission housing H and selectively connects and fixes the ninth shaft TM9 to the transmission housing H.

The engaging elements including the first, second, and third clutches C1, C2, and C3 and the first, second, and third brakes B1, B2, and B3 may be multi-plates friction elements of wet type that are operated by hydraulic pressure. Multi-plates friction elements of wet type are mainly used as the engaging elements, but dog clutches, electric clutches, or magnetic clutches that can be operated by electric signal from an electric control unit can be used as the engaging elements.

FIG. 2 is an operation chart of engaging elements at each speed stage in the planetary gear train according to the first exemplary form of the present disclosure.

Referring to FIG. 2, three engaging elements among the first, second, and third clutches C1, C2, and C3 and the first, second, and third brakes B1, B2, and B3 are operated at each speed stage in the planetary gear train according to the first exemplary form of the present disclosure.

The second clutch C2 and the first and second brakes B1 and B2 are operated at a first forward speed stage D1.

In a state that the first shaft TM1 is connected with the seventh shaft TM7 by operation of the second clutch C2, torque of the input shaft IS is input to the first shaft TM1.

At this state, the fourth and eighth shafts TM4 and TM8 are operated as the fixed elements by operation of the first and second brakes B1 and B2. Therefore, the torque of the input shaft IS is shifted into the first forward speed stage, and the first forward speed stage is output through the output shaft OS connected with the second shaft TM2.

The second and third clutches C2 and C3 and the first brake B1 are operated at a second forward speed stage D2.

In a state that the first shaft TM1 is connected with the seventh shaft TM7 by operation of the second clutch C2 and the sixth shaft TM6 is connected with the eighth shaft TM8 by operation of the third clutch C3, the torque of the input shaft IS is input to the first shaft TM1.

At this state, the fourth shaft TM4 is operated as the fixed element by operation of the first brake B1. Therefore, the torque of the input shaft IS is shifted into the second forward speed stage, and the second forward speed stage is output through the output shaft OS connected with the second shaft TM2.

The first and second clutches C1 and C2 and the first brake B1 are operated at a third forward speed stage D3.

In a state that the second shaft TM2 is connected with the fifth shaft TM5 by operation of the first clutch C1 and the first shaft TM1 is connected with the seventh shaft TM7 by operation of the second clutch C2, the torque of the input shaft IS is input to the first shaft TM1.

At this state, the fourth shaft TM4 is operated as the fixed element by operation of the first brake B1. Therefore, the torque of the input shaft IS is shifted into the third forward speed stage, and the third forward speed stage is output through the output shaft OS connected with the second shaft TM2.

The first and third clutches C1 and C3 and the first brake B1 are operated at a fourth forward speed stage D4.

In a state that the second shaft TM2 is connected with the fifth shaft TM5 by operation of the first clutch C1 and the sixth shaft TM6 is connected with the eighth shaft TM8 by operation of the third clutch C3, the torque of the input shaft IS is input to the first shaft TM1.

At this state, the fourth shaft TM4 is operated as the fixed element by operation of the first brake B1. Therefore, the torque of the input shaft IS is shifted into the fourth forward speed stage, and the fourth forward speed stage is output through the output shaft OS connected with the second shaft TM2.

The first, second, and third clutches C1, C2, and C3 are operated at a fifth forward speed stage D5.

In a state that the second shaft TM2 is connected with the fifth shaft TM5 by operation of the first clutch C1, the first shaft TM1 is connected with the seventh shaft TM7 by operation of the second clutch C2, and the sixth shaft TM6 is connected with the eighth shaft TM8 by operation of the third clutch C3, the torque of the input shaft IS is input to the first shaft TM1.

In this case, the first, second, third, fourth, and fifth planetary gear sets PG1, PG2, PG3, PG4, and PG5 become lock-up states. Therefore, the torque of the input shaft IS is output through the output shaft OS connected with the second shaft TM2 without speed change.

The first and third clutches C1 and C3 and the third brake B3 are operated at a sixth forward speed stage D6.

In a state that the second shaft TM2 is connected with the fifth shaft TM5 by operation of the first clutch C1 and the sixth shaft TM6 is connected with the eighth shaft TM8 by operation of the third clutch C3, the torque of the input shaft IS is input to the first shaft TM1.

At this state, the ninth shaft TM9 is operated as the fixed element by operation of the third brake B3. Therefore, the torque of the input shaft IS is shifted into the sixth forward speed stage, and the sixth forward speed stage is output through the output shaft OS connected with the second shaft TM2.

The first clutch C1 and the second and third brakes B2 and B3 are operated at a seventh forward speed stage D7.

In a state that the second shaft TM2 is connected with the fifth shaft TM5 by operation of the first clutch C1, the torque of the input shaft IS is input to the first shaft TM1.

At this state, the eighth and ninth shafts TM8 and TM9 are operated as the fixed elements by operation of the second and third brakes B2 and B3. Therefore, the torque of the input shaft IS is shifted into the seventh forward speed stage, and the seventh forward speed stage is output through the output shaft OS connected with the second shaft TM2.

The first and second clutches C1 and C2 and the third brake B3 are operated at an eighth forward speed stage D8.

In a state that the second shaft TM2 is connected with the fifth shaft TM5 by operation of the first clutch C1 and the first shaft TM1 is connected with the seventh shaft TM7 by operation of the second clutch C2, the torque of the input shaft IS is input to the first shaft TM1.

At this state, the ninth shaft TM9 is operated as the fixed element by operation of the third brake B3. Therefore, the torque of the input shaft IS is shifted into the eighth forward speed stage, and the eighth forward speed stage is output through the output shaft OS connected with the second shaft TM2.

The second clutch C2 and the second and third brakes B2 and B3 are operated at a ninth forward speed stage D9.

In a state that the first shaft TM1 is connected with the seventh shaft TM7 by operation of the second clutch C2, the torque of the input shaft IS is input to the first shaft TM1.

At this state, the eighth and ninth shafts TM8 and TM9 are operated as the fixed elements by operation of the second and third brakes B2 and B3. Therefore, the torque of the input shaft IS is shifted into the ninth forward speed stage, and the ninth forward speed stage is output through the output shaft OS connected with the second shaft TM2.

The second and third clutches C2 and C3 and the third brake B3 are operated at a tenth forward speed stage D10.

In a state that the first shaft TM1 is connected with the seventh shaft TM7 by operation of the second clutch C2 and the sixth shaft TM6 is connected with the eighth shaft TM8 by operation of the third clutch C3, the torque of the input shaft IS is input to the first shaft TM1.

At this state, the ninth shaft TM9 is operated as the fixed element by operation of the third brake B3. Therefore, the torque of the input shaft IS is shifted into the tenth forward speed stage, and the tenth forward speed stage is output through the output shaft OS connected with the second shaft TM2.

Meanwhile, a reverse speed stage can be achieved in three ways. That is, a first reverse speed stage REV1, a second reverse speed stage REV2, and a third reverse speed stage REV3 can be achieved. However, gear ratios of the first reverse speed stage REV1, the second reverse speed stage REV2, and the third reverse speed stage REV3 are the same.

At the first reverse speed stage REV1, the third clutch C3 and the first and second brakes B1 and B2 are operated.

In a state that the sixth shaft TM6 is connected with the eighth shaft TM8 by operation of the third clutch C3, the torque of the input shaft IS is input to the first shaft TM1.

At this state, the fourth and eighth shafts TM4 and TM8 are operated as the fixed elements by operation of the first and second brakes B1 and B2. Therefore, the torque of the input shaft IS is shifted into the first reverse speed stage, and the first reverse speed stage is output through the output shaft OS connected with the second shaft TM2.

At the second reverse speed stage REV2, the third clutch C3 and the first and third brakes B1 and B3 are operated.

In a state that the sixth shaft TM6 is connected with the eighth shaft TM8 by operation of the third clutch C3, the torque of the input shaft IS is input to the first shaft TM1.

At this state, the fourth and ninth shafts TM4 and TM9 are operated as the fixed elements by operation of the first and third brakes B1 and B3. Therefore, the torque of the input shaft IS is shifted into the second reverse speed stage, and the second reverse speed stage is output through the output shaft OS connected with the second shaft TM2.

At the third reverse speed stage REV3, the first, second, and third brakes B1, B2, and B3 are operated.

The torque of the input shaft IS is input to the first shaft TM1.

At this state, the fourth, eighth, and ninth shafts TM4, TM8, and TM9 are operated as the fixed elements by operation of the first, second, and third brakes B1, B2, and B3. Therefore, the torque of the input shaft IS is shifted into the third reverse speed stage, and the third reverse speed stage is output through the output shaft OS connected with the second shaft TM2.

Figure 3:
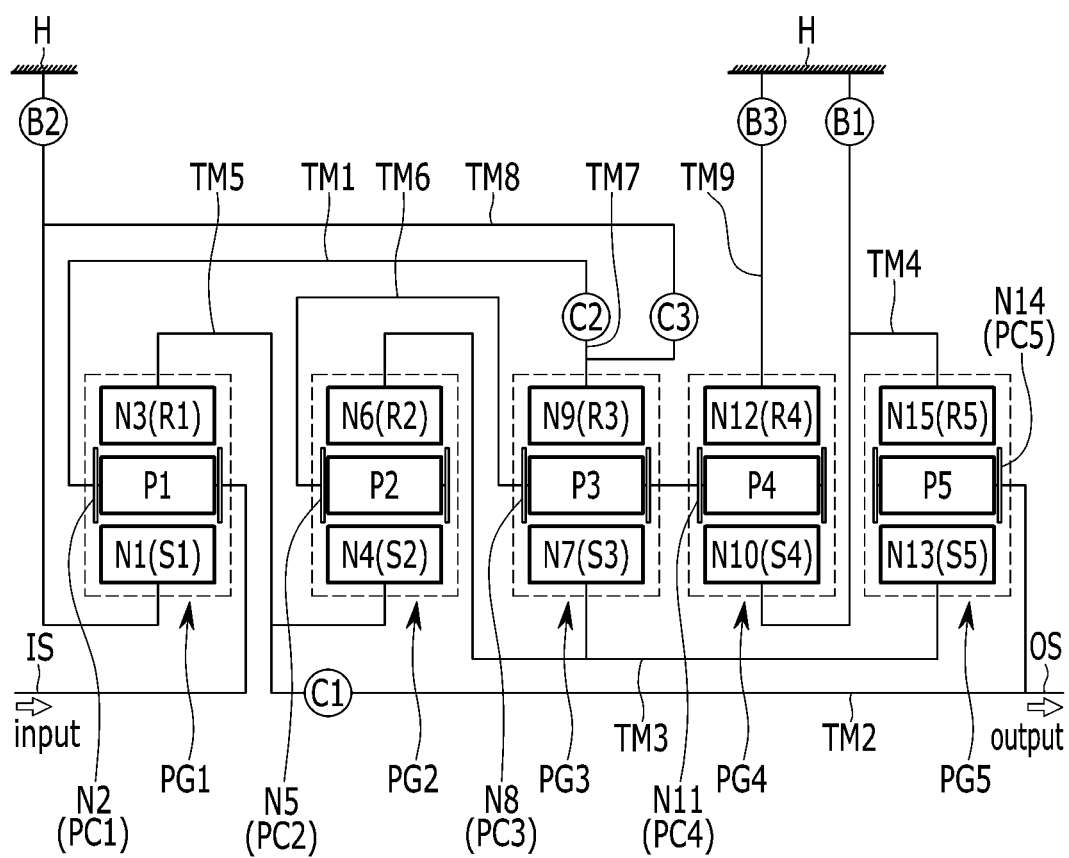
FIG. 3 is a schematic diagram of a planetary gear train according to a second exemplary form of the present disclosure.

FIG. 3 is a schematic diagram of a planetary gear train according to a second exemplary form of the present disclosure.

Referring to FIG. 1 and FIG. 3, the third clutch C3 in the planetary gear train according to the first exemplary form of the present disclosure is disposed between the sixth shaft TM6 and the eighth shaft TM8 and selectively connects the sixth shaft TM6 with the eighth shaft TM8, but in the planetary gear train according to the second exemplary form of the present disclosure, the third clutch C3 is disposed between the seventh shaft TM7 and the eighth shaft TM8 and selectively connects the seventh shaft TM7 with the eighth shaft TM8.

The arrangement of the third clutch C3 according to the second exemplary form differs from that according to the first exemplary form, but connections of the nine shafts TM1 to TM9, two clutches C1 and C2, and the three brakes B1 to B3 according to the second exemplary form are the same as those according to the first exemplary form. Therefore, operations and effects of the planetary gear train according to the second exemplary form are the same as those according to the first exemplary form.

According to the first and second exemplary forms of the present disclosure, ten forward speed stages and one reverse speed stage may be achieved by using five planetary gear sets PG1, PG2, PG3, PG4, and PG5 and six engaging elements including three clutches C1, C2, and C3 and three brakes B1, B2, and B3.

In addition, since gear ratio span is greater than 8.7, driving efficiency of the engine may be increased. In addition, since linearity of step ratios can be secured due to multiple speed stages, drivability such as acceleration before and after gear shifts, rhythmical engine speed, and so on may be improved.

In addition, since ten forward speed stages and one reverse speed stage are achieved by using the reduced number of engaging elements, drag loss of clutches and brakes may be reduced and thus power delivery efficiency and fuel economy may be improved.

In addition, since a planetary gear set of an output side in torque parallel type is used and torque is evenly shared to each planetary gear set and each engaging element, torque delivery efficiency and durability may be improved.

In addition, since five planetary gear sets are used to achieve ten forward speed stages and one reverse speed stage, flexibility of output gear ratios may be increased and linearity of step ratios may be improved.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

PG1, PG2, PG3, PG4, PG5: first, second, third, fourth, and fifth planetary gear sets
S1, S2, S3, S4, S5: first, second, third, fourth, and fifth sun gears
PC1, PC2, PC3, PC4, PC5: first, second, third, fourth, and fifth planet carriers
R1, R2, R3, R4, R5: first, second, third, fourth, and fifth ring gears
C1, C2, C3: first, second, and third clutches
B1, B2, B3: first, second, and third brakes
IS: input shaft
OS: output shaft
TM1, TM2, TM3, TM4, TM5, TM6, TM7, TM8, TM9: first, second, third, fourth, fifth, sixth, seventh, eighth, and ninth shafts

What is claimed is:

1. A planetary gear train of an automatic transmission for a vehicle, the planetary gear train comprising:
    an input shaft configured to receive a torque from an engine;
    an output shaft configured to output a torque;
    a first planetary gear set including first, second, and third rotation elements;
    a second planetary gear set including fourth, fifth, and sixth rotation elements;

a third planetary gear set including seventh, eighth, and ninth rotation elements;
a fourth planetary gear set including tenth, eleventh, and twelfth rotation elements;
a fifth planetary gear set including thirteenth, fourteenth, and fifteenth rotational elements;
a first shaft connected with the second rotation element and the input shaft;
a second shaft connected with the fourteenth rotation element and the output shaft;
a third shaft connected with the sixth rotation element, the seventh rotation element, and the thirteenth rotation element;
a fourth shaft connected with the tenth rotation element and the fifteenth rotation element;
a fifth shaft connected with the third rotation element and the fourth rotation element;
a sixth shaft connected with the fifth rotation element, the eighth rotation element, and the eleventh rotation element;
a seventh shaft connected with the ninth rotation element;
an eighth shaft connected with the first rotation element; and
a ninth shaft connected with the twelfth rotation element.

2. The planetary gear train of claim 1, further comprising:
a first clutch disposed between the second shaft and the fifth shaft;
a second clutch disposed between the first shaft and the seventh shaft;
a third clutch disposed between the sixth shaft and the eighth shaft;
a first brake disposed between the fourth shaft and a transmission housing;
a second brake disposed between the eighth shaft and the transmission housing; and
a third brake disposed between the ninth shaft and the transmission housing.

3. The planetary gear train of claim 1, further comprising:
a first clutch disposed between the second shaft and the fifth shaft;
a second clutch disposed between the first shaft and the seventh shaft;
a third clutch disposed between the seventh shaft and the eighth shaft;
a first brake disposed between the fourth shaft and a transmission housing;
a second brake disposed between the eighth shaft and the transmission housing; and
a third brake disposed between the ninth shaft and the transmission housing.

4. The planetary gear train of claim 1, wherein the first, second, and third rotational elements are a first sun gear, a first planet carrier, and a first ring gear respectively,
the fourth, fifth, and sixth rotational elements are a second sun gear, a second planet carrier, and a second ring gear respectively,
the seventh, eighth, and ninth rotational elements are a third sun gear, a third planet carrier, and a third ring gear respectively,
the tenth, eleventh, and twelfth rotational elements are a fourth sun gear, a fourth planet carrier, and a fourth ring gear respectively, and
the thirteenth, fourteenth, and fifteenth rotational elements are a fifth sun gear, a fifth planet carrier, and a fifth ring gear respectively.

5. The planetary gear train of claim 1, wherein the first, second, third, fourth, and fifth planetary gear sets are disposed in a sequence of the first, second, third, fourth, and fifth planetary gear sets from an engine side.

6. A planetary gear train of an automatic transmission for a vehicle, the planetary gear train comprising:
an input shaft configured to receive a torque from an engine;
an output shaft configured to output a torque;
a first planetary gear set including first, second, and third rotation elements;
a second planetary gear set including fourth, fifth, and sixth rotation elements;
a third planetary gear set including seventh, eighth, and ninth rotation elements;
a fourth planetary gear set including tenth, eleventh, and twelfth rotation elements;
a fifth planetary gear set including thirteenth, fourteenth, and fifteenth rotational elements;
a first shaft connected with the second rotation element and the input shaft;
a second shaft connected with the fourteenth rotation element and the output shaft;
a third shaft connected with the sixth rotation element, the seventh rotation element, and the thirteenth rotation element;
a fourth shaft connected with the tenth rotation element and the fifteenth rotation element;
a fifth shaft connected with the third rotation element and the fourth rotation element;
a sixth shaft connected with the fifth rotation element, the eighth rotation element, and the eleventh rotation element;
a seventh shaft connected with the ninth rotation element; and
a plurality of shafts configured to selectively and respectively connect a transmission housing to corresponding rotation elements selected from the rotation elements of the first and fourth planetary gear sets, wherein the corresponding rotation elements are not connected to any of the first to seventh shafts.

7. The planetary gear train of claim 6, wherein the plurality of shafts comprise:
an eighth shaft connected with the first rotation element; and
a ninth shaft connected with the twelfth rotation element.

8. The planetary gear train of claim 7, further comprising:
a first clutch disposed between the second shaft and the fifth shaft;
a second clutch disposed between the first shaft and the seventh shaft;
a third clutch disposed between the sixth shaft and the eighth shaft;
a first brake disposed between the fourth shaft and the transmission housing;
a second brake disposed between the eighth shaft and the transmission housing; and
a third brake disposed between the ninth shaft and the transmission housing.

9. The planetary gear train of claim 7, further comprising:
a first clutch disposed between the second shaft and the fifth shaft;
a second clutch disposed between the first shaft and the seventh shaft;
a third clutch disposed between the seventh shaft and the eighth shaft;
a first brake disposed between the fourth shaft and the transmission housing;

a second brake disposed between the eighth shaft and the transmission housing; and a third brake disposed between the ninth shaft and the transmission housing.

10. The planetary gear train of claim 6, wherein the first, second, and third rotational elements are a first sun gear, a first planet carrier, and a first ring gear respectively, the fourth, fifth, and sixth rotational elements are a second sun gear, a second planet carrier, and a second ring gear respectively, the seventh, eighth, and ninth rotational elements are a third sun gear, a third planet carrier, and a third ring gear respectively, the tenth, eleventh, and twelfth rotational elements are a fourth sun gear, a fourth planet carrier, and a fourth ring gear respectively, and the thirteenth, fourteenth, and fifteenth rotational elements are a fifth sun gear, a fifth planet carrier, and a fifth ring gear respectively.

11. The planetary gear train of claim 6, wherein the first, second, third, fourth, and fifth planetary gear sets are disposed in a sequence of the first, second, third, fourth, and fifth planetary gear sets from an engine side.

12. A planetary gear train of an automatic transmission for a vehicle, the planetary gear train comprising:

an input shaft configured to receive a torque from an engine;

an output shaft configured to output a torque;

a first planetary gear set including first, second, and third rotation elements;

a second planetary gear set including fourth, fifth, and sixth rotation elements;

a third planetary gear set including seventh, eighth, and ninth rotation elements;

a fourth planetary gear set including tenth, eleventh, and twelfth rotation elements;

a fifth planetary gear set including thirteenth, fourteenth, and fifteenth rotational elements;

a first shaft connected with the second rotation element and the input shaft;

a second shaft connected with the fourteenth rotation element and the output shaft;

a third shaft connected with the sixth rotation element, the seventh rotation element, and the thirteenth rotation element;

a fourth shaft connected with the tenth rotation element and the fifteenth rotation element;

a fifth shaft connected with the third rotation element and the fourth rotation element;

a sixth shaft connected with the fifth rotation element, the eighth rotation element, and the eleventh rotation element;

a seventh shaft connected with the ninth rotation element; and eighth and ninth shafts configured to selectively and respectively connect, via brakes, a transmission housing to corresponding rotation elements selected from the rotation elements of the first and fourth planetary gear sets, wherein the corresponding rotation elements are not connected to any one of the first to seventh shafts.

13. The planetary gear train of claim 12, wherein the second shaft and the fifth shaft, the first shaft and the seventh shaft, and the sixth shaft and the eighth shaft are selectively and respectively connected with each other through clutches, the eighth shaft is connected with the first rotation element, and the ninth shaft is connected with the twelfth rotation element.

14. The planetary gear train of claim 13, wherein the clutches comprise:

a first clutch disposed between the second shaft and the fifth shaft;

a second clutch disposed between the first shaft and the seventh shaft; and a third clutch disposed between the sixth shaft and the eighth shaft, and wherein the planetary gear train includes brakes comprising:

a first brake disposed between the fourth shaft and the transmission housing;

a second brake disposed between the eighth shaft and the transmission housing; and a third brake disposed between the ninth shaft and the transmission housing.

15. The planetary gear train of claim 12, wherein the second shaft and the fifth shaft, the first shaft and the seventh shaft, and the seventh shaft and the eighth shaft are selectively connected with each other through clutches, the eighth shaft is connected with the first rotation element, and the ninth shaft is connected with the twelfth rotation element.

16. The planetary gear train of claim 15, wherein the clutches comprise:

a first clutch disposed between the second shaft and the fifth shaft;

a second clutch disposed between the first shaft and the seventh shaft; and a third clutch disposed between the seventh shaft and the eighth shaft, and wherein the planetary gear train comprises brakes comprising:

a first brake disposed between the fourth shaft and the transmission housing;

a second brake disposed between the eighth shaft and the transmission housing; and a third brake disposed between the ninth shaft and the transmission housing.

17. The planetary gear train of claim 12, wherein the first, second, and third rotational elements are a first sun gear, a first planet carrier, and a first ring gear respectively, the fourth, fifth, and sixth rotational elements are a second sun gear, a second planet carrier, and a second ring gear respectively, the seventh, eighth, and ninth rotational elements are a third sun gear, a third planet carrier, and a third ring gear respectively, the tenth, eleventh, and twelfth rotational elements are a fourth sun gear, a fourth planet carrier, and a fourth ring gear respectively, and the thirteenth, fourteenth, and fifteenth rotational elements are a fifth sun gear, a fifth planet carrier, and a fifth ring gear respectively.

* * * * *